United States Patent [19]

Frank et al.

[11] 4,008,966

[45] Feb. 22, 1977

[54] METHOD AND APPARATUS FOR BEAM SAMPLING BY ACOUSTIC PULSES

[75] Inventors: Konrad Frank, Aberdeen, Md.; Peter F. Klon, Cudahy, Wis.

[73] Assignee: The United States of America as represented by the Secretary of the Army, Washington, D.C.

[22] Filed: Oct. 9, 1975

[21] Appl. No.: 620,978

[52] U.S. Cl. .......................... 356/218; 350/161 R; 356/51

[51] Int. Cl.² ................... G01J 1/42; G01N 21/34

[58] Field of Search .......... 356/218, 51; 350/161 R

[56] References Cited

UNITED STATES PATENTS

| | | | |
|---|---|---|---|
| 3,566,303 | 2/1971 | DeMaria | 350/161 |
| 3,741,648 | 6/1973 | Nickel | 350/161 |
| 3,753,157 | 8/1973 | Ash et al. | 350/161 |

Primary Examiner—John K. Carbon
Assistant Examiner—Stewart Levy
Attorney, Agent, or Firm—Nathan Edelberg; Robert P. Gibson; Saul Elbaum

[57] ABSTRACT

A method and apparatus for simultaneously sampling and scanning a portion of a laser beam with acoustic energy. An acoustic pulse is propagated across the light beam and the pressure variations which comprise the pulse form a diffraction grating for deflecting the light beam over its volume of interaction with the pulse. As the pulse propagates, successive parts of the beam are deflected and an effective scan is performed. Focussing optics focus the diffracted beam on a photodetector and analyzing and controlling electronics is provided. Additionally, several embodiments for providing a two-dimensional scan of the laser beam portion are disclosed.

9 Claims, 5 Drawing Figures

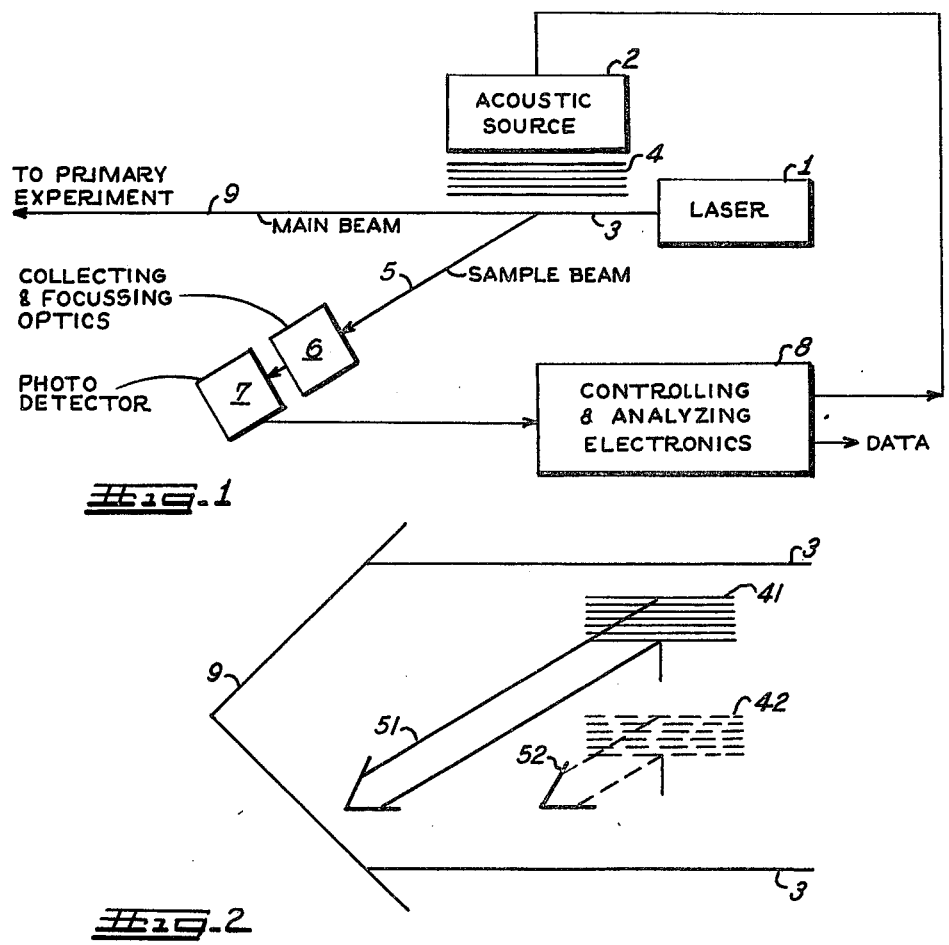
Fig. 1
Fig. 2
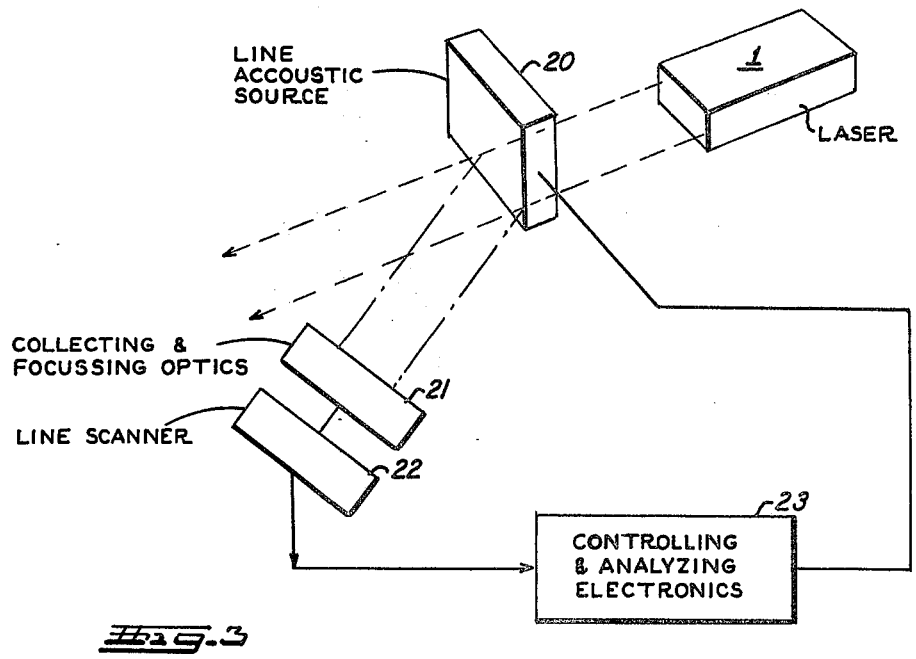
Fig. 3

4,008,966

METHOD AND APPARATUS FOR BEAM SAMPLING BY ACOUSTIC PULSES

RIGHTS OF THE GOVERNMENT

The invention described herein may be manufactured, used, and licensed by or for the United States Government for governmental purposes without the payment to us of any royalty thereon.

The present invention is directed to a method and apparatus for obtaining low power samples from a high power laser beam such that the beam is not significantly altered by the sampling mechanism.

In conducting experiments with high power laser beams it is necessary to know the spatial and temporal variations of the beam so that the results may be correctly interpreted. Conventional techniques of beam sampling which involve introducing some optical components into the beam path are unsatisfactory with high power lasers because at high powers the optical properties of the sampling component may no longer linearly depend on intensity and because the sampling component may be severely degraded or even destroyed by the energy in the beam, which causes further uncontrolled and undiagnosed alterations of the beam characteristics. In some methods, low duty cycle, full beam energy samples are obtained which don't lend themselves to detailed beam diagnostics.

To overcome these disadvantages, a method of beam sampling which the acousto-optic interaction process has been proposed. According to this method of the prior art, which utilizes continuous sound waves, a high frequency sound wave (ultrasonic) is interacted with the light beam to diffract out a low power sample. The alternate regions of high and low gas density in the sound wave form a weak phase grating which diffracts out a portion of the beam. Such a continuous wave acoustic beam sampler is shown in U.S. Pat. No. 3,741,648.

The problem with the continuous wave samplers of the prior art is that they require complex scanners for deriving information from the diffracted beam. Thus in the prior art sampler the acoustic wave overlaps the entire optic beam at the same time and the deflected out portion is a two-dimensional beam which must be scanned in either one or two dimensions depending on whether one-dimensional or two-dimensional information is required. Since the high power lasers in use today operate in the infrared part of the spectrum, this requires a complex arrangement, such as a linear or two-dimensional detector array or a mechanical or electro-mechanical one or two-dimensional scanner.

According to the present invention, a sampling method and apparatus is provided which retains the advantages of acousto-optic sampling over conventional techniques but which provides an inherent scanning of the light beam, thus at least in part eliminating the complex and expensive external scanning equipment. This is accomplished by propagating an acoustic pulse across the light beam instead of a continuous acoustic wave. As the acoustic pulse propagates across the light beam, light is diffracted only at the volume of acoustic energy-light interaction and thus the propagating pulse successively deflects successive parts of the beam in its travel across the width thereof, thus performing an effective scan of the beam. The successively deflected light beam portions are incident on collecting and/or focussing optics and are imaged onto a photodetector. Means for correlating the position of the pulse within the beam with the photodetector signal is provided. In further embodiments two-dimensional scanning is provided for.

It is thus an object of the invention to provide a method and apparatus for acoustic energy sampling of a light beam wherein the acoustic energy performs a scan of the light beam.

It is a further object of the invention to provide a method and apparatus for acoustic energy sampling of a light beam wherein the detecting and interpreting circuitry and apparatus is simpler and less expensive than in the prior art.

The invention will be better understood by referring to the accompanying drawings in which:

FIG. 1 is a block diagram of an embodiment of the invention.

FIG. 2 is a drawing illustrating the principle of the scanning acoustic pulse.

FIG. 3 is an embodiment of the invention which provides a two-dimensional scan of the laser beam.

Figure 4:
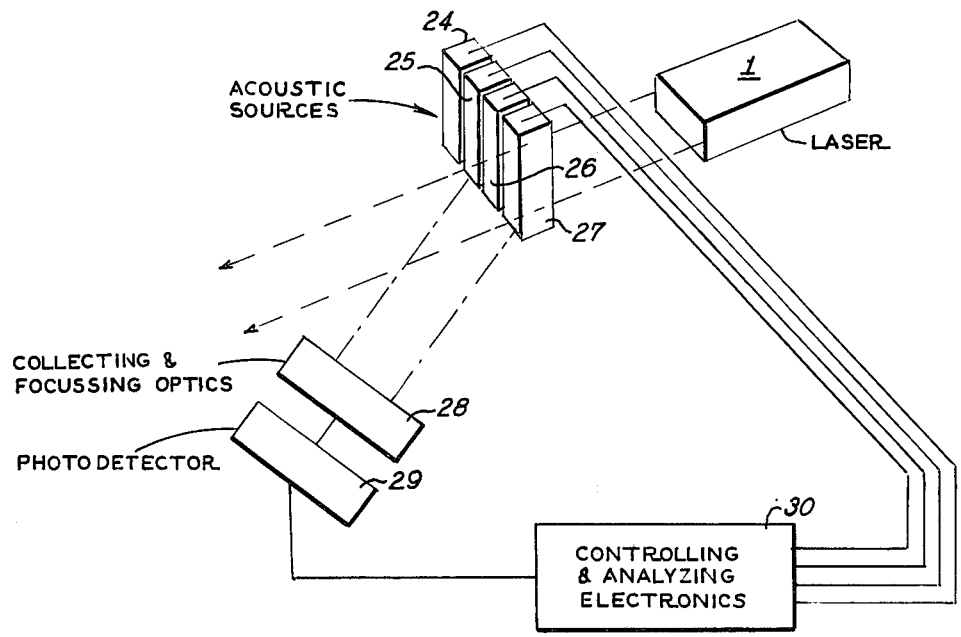
FIG. 4 is a further embodiment of the invention which provides a two-dimensional scan of the laser beam.

Referring to FIG. 1, laser 1 emits high intensity beam 3. Acoustic source 2 which may, for instance, be an electrostatic or piezoelectric transducer is disposed with respect to laser beam 3 so that the acoustic energy output of the source interacts with the laser beam. Acoustic source 2 is arranged, by controlling and analyzing electronics 8, to produce an acoustic pulse output. The acoustic pulse propagates across laser beam 3 and the alternate regions of high and low gas density in the pulse from a weak phase grating which diffracts out a portion of the beam over the volume of acoustic pulse--light beam interaction. For optimum diffraction the acoustic wavefronts should be inclined at the Bragg angle with respect to the direction of the optic beam. For air and gasses and the acoustic frequencies which can practically be propagated (less than 1 Mhz) the Bragg angle is typically about 0.9°–1°, and the diffracted portion is diffracted at twice the Bragg angle.

FIG. 2 shows the interaction of the acoustic pulse with the light beam in greater detail. At some time $t_1$ the acoustic pulse is at a position 41 in the figure. At this time $t_1$ the transmission grating formed by the wave trains within the pulse envelope diffract out a beam sample 51 corresponding to the overlapped optic cross-section. At a later time $t_2$ the pulse has travelled a short distance and is now at the position 42. Now the pulse overlaps a different portion of the optic beam and similarly diffracts out a new sample 52 corresponding to a new part of the optic beam cross-section. In this manner then the acoustic pulse provides a one-dimensional scan of the optic beam cross-section as it progresses thereacross. The duration of the pulse is arranged to be short enough so that it overlaps only part of the optic beam, but long enough to satisfy sampling criteria.

In FIG. 1, main beam 9 proceeds on to the primary experiment while diffracted sample beam 5 is directed to collecting and focussing optics 6 and photodetector 7. As the acoustic pulse scans across the laser beam, the position of sample beam 5 continuously changes as shown in FIG. 2 and collecting and focussing optics 6 is arranged to focus the incoming beam no matter what its position at photodetector 7. Specific forms which such optics may take are well known to those skilled in the optical arts and when a $CO_2$ laser is used, reflecting optics are preferably utilized in collecting and focussing optics 6. Controlling and analyzing electronics 8 includes means for measuring the time of arrival of the sample signal in relation to the start of the acoustic pulse, which is a measure of the position of the pulse in the light beam and therefore of the position of the diffracted portion being sampled by the photodetector. Thus in contra-distinction to the prior art, by the use of the inherent scanning effect of the acoustic pulse a single photodetector 7 may be utilized while still obtaining a scan of the light beam. Analyzing electronics 8 includes appropriate components for analyzing the output response of the photodetector and these may vary with the particular application.

Figure 5:
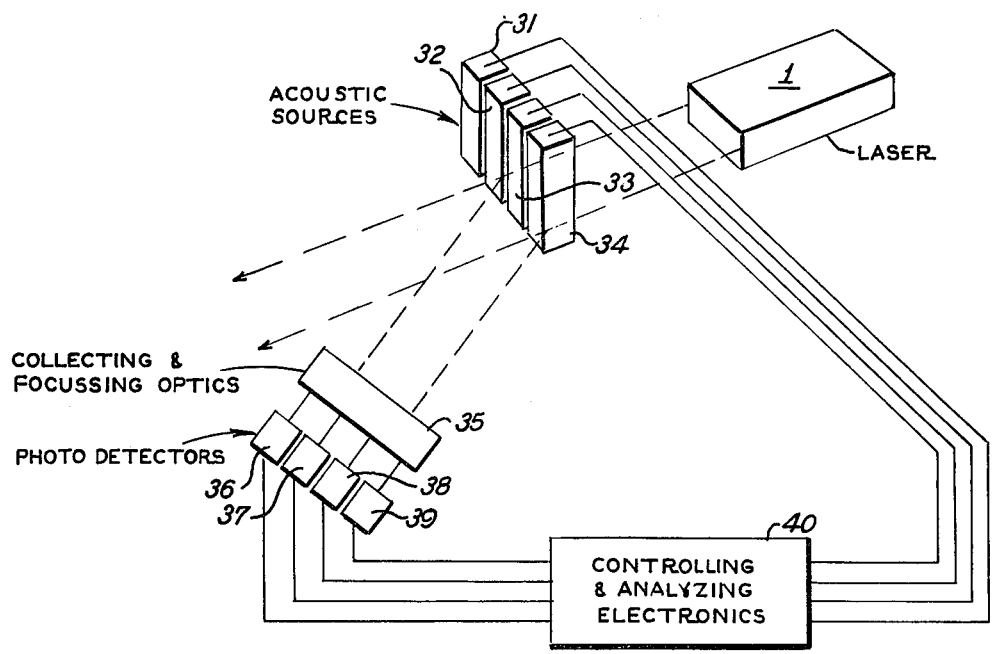
FIG. 5 is still a further embodiment of the invention which provides a two-dimensional scan of the laser beam.

FIGS. 3, 4 and 5 are directed to embodiments which provide two-dimensional scans of the laser beam and, as will be observed, the acoustic source means and the detector means may take on several forms for accomplishing this. In the embodiment of FIG. 3, line acoustic source 20 and line scanner photodetecting means 22 are provided. Line acoustic source 20 extends across the width of the light beam and diffracts out a strip as the line pulse propagates through the beam. This strip is focussed by optics 21 on line scanner 22 which may comprise a mechanical or electro-mechanical line scanning device or a linear array of photodetectors. In this embodiment, the framing rate depends on the transit time of the acoustic pulse across the width of the beam and the number of lines per frame is determined by the line scanning rate.

The embodiment shown in FIG. 4 utilizes a linear array of acoustic sources and a single photodetector. The acoustic array is positioned at approximately right angles to the optic beam direction and while four acoustic sources 24, 25, 26 and 27 are shown in FIG. 4 any appropriate number may be utilized, depending on the resolution desired. Controlling electronics 30 is arranged to control the acoustic sources so that each respective transducer in the array generates an acoustic pulse only after the pulse generated by the previous source has traversed the beam. Thus in FIG. 4, acoustic source 25 would be arranged to generate a pulse only after the pulse produced by acoustic source 24 had traversed the beam and so on for acoustic sources 26 and 27. Optics 28 focusses the diffracted beams on to photodetector 29, the output of which is connected to controlling and analyzing electronics 30. In this embodiment all of the information relating to the two-dimensional scan is sensed by a single photodetector, but because the acoustic sources are operated in succession, the total scanning time is longer than in the embodiment of FIG. 3. In the embodiment of FIG. 4, the number of lines per frame is determined by the number of transducers in the array and the framing rate depends upon the accumulative transit times of all the acoustic pulses. The embodiment of FIG. 3 has the advantage of having better resolution and faster framing rates while the embodiment of FIG. 4 has the advantage of being simpler and less costly. In both embodiments, the controlling and analyzing electronics is appropriately designed, as known by those skilled in the art, for proper line and frame timing, acoustic pulse length gating, acoustic frequency adjusting, and data recording and displaying.

In the embodiment of FIG. 5, as in FIG. 4 any appropriate number of acoustic sources are used, and as shown in the Figure, they are positioned at approximately right angles to the beam direction. Each source, for instance in the Figure, sources 31, 32, 33 and 34 is arranged to emit a pulse at a different frequency so that different phase gratings are generated in the light beam by each source. The acoustic sources are activated simultaneously by controlling electronics 40 and a diffracted beam resulting from a pulse generated by each source is focussed on a different photodetector 36, 37, 38 or 39 by optics 35. Since each acoustic source creates a different scanning phase grating in the light beam, the beam is diffracted differently by each acoustic pulse and the difference in diffraction may be used to correlate each diffracted beam with its corresponding photodetector.

In one experiment performed according to the invention, a $CO_2$ 10.6 $\mu$m beam of 11 watts single mode within a beam diameter of about 0.4 cm was diffracted by a pulse of 325 khz acoustic frequency in air.

We wish it to be understood that we do not desire to be limited to the exact details of construction shown and described, for obvious modifications can be made by a person skilled in the art.

What is claimed is:

1. An apparatus for simultaneously sampling and scanning a portion of a light beam with acoustic energy, comprising, means for generating an acoustic pulse consisting of one or more cycles of a specified frequency and having a length shorter then the width of said light beam, means for propagating said acoustic pulse across said light beam, the pressure variations which comprise said pulse forming a diffraction grating for deflecting said light beam over its volume of interaction with said pulse, whereby as said pulse propagates across the width of said portion of said beam successive parts thereof are deflected.

2. An apparatus for simultaneously sampling and scanning a portion of a light beam with acoustic energy, comprising, means in proximity to said light beam for generating an acoustic pulse and for propagating said pulse across said light beam, the pressure variations which comprise said pulse forming a diffraction grating for deflecting said light beam over its volume of interaction with said pulse, whereby as said pulse propagates across said portion of said beam successive parts thereof are deflected, and means for detecting said successive deflected beam parts, means for timing the travel of said pulse across said beam portion, and means for correlating said detecting with said timing so that the position of said detected beam parts is identified.

3. The apparatus of claim 2 wherein said means for propagating comprises means for propagating said pulse approximately perpindicular to the direction of said light beam.

4. The apparatus of claim 2 wherein said means for generating an acoustic pulse comprises a linear array of acoustic source means oriented across the width of said beam, and means for causing each source means to generate an acoustic pulse after the pulse generated by an adjacent source means has propagated across said beam portion.

5. The apparatus of claim 2 wherein said means for generating an acoustic pulse comprises a linear array of acoustic source means oriented across the width of said beam, each said source means emitting an acoustic pulse when energized at a different frequency than the other source means of said array, and means for energizing said source means simultaneously.

6. The apparatus of claim 2 wherein a two-dimensional scan of said beam portion is provided, said means for generating an acoustic pulse comprising means for generating a pulse having a spatial length which extends across the width of said beam, and said means for detecting comprising a line scanner means.

7. The apparatus of claim 6 wherein said line scanner means comprises a linear array of photodetectors.

8. A method of simultaneously sampling and scanning a portion of a light beam with acoustic energy comprising the steps of, generating an acoustic pulse consisting of one or more cycles of a specified frequency and having a length shorter than the width of said light beam, and propagating said acoustic pulse across said light beam, the pressure variations which comprise said acoustic pulse forming a diffraction grating for deflecting said light beam over its volume of interaction with said pulse, whereby as said pulse propagates across the width of said portion of said beam, successive parts thereof are deflected.

9. The method of claim 1 further comprising the steps of, detecting said successive deflected beam parts, timing the travel of said pulse across said beam portion and, correlating said detecting with said timing so that the position of any detected beam part is identified.

* * * * *